United States Patent [19]

Abe et al.

[11] Patent Number: 5,130,203
[45] Date of Patent: Jul. 14, 1992

[54] METAL GASKET AND METHOD OF PRODUCING THE SAME

[75] Inventors: Tsunehiko Abe; Hiroyuki Nakano, both of Kawaguchi; Kazuaki Shiotani, Urawa; Yoshiharu Takada, Chiba, all of Japan

[73] Assignees: Nippon Leakless Industry Co., Ltd.; Sanshin Kogyo Co., Ltd., both of Tokyo, Japan

[21] Appl. No.: 386,219

[22] Filed: Jul. 28, 1989

[30] Foreign Application Priority Data

Jul. 28, 1988 [JP] Japan .................................. 63-186786
Oct. 3, 1988 [JP] Japan .......................... 63-128750[U]

[51] Int. Cl.$^5$ ......................... B32B 15/04; B32B 15/06
[52] U.S. Cl. .................................... 428/457; 428/462; 428/463; 428/492; 428/519
[58] Field of Search ............... 428/462, 457, 492, 463, 428/519

[56] References Cited

U.S. PATENT DOCUMENTS 2,957,784 10/1960 Schiefelbein ........................ 428/462
4,088,621 5/1978 Miller ............................ 428/457 X
5,004,650 4/1991 Ashizawa et al. ................... 428/463

OTHER PUBLICATIONS

Kirk–Othmer Encyclopedia of Chemical Technology, Third Ed. vol. 15, pp. 307–308, John Wiley & Sons, New York, 1982.
Kirk–Othmer Encyclopedia of Chemical Technology, Third Ed., vol. 20, pp. 400, 434, John Wiley & Sons, New York, 1982.
Handbook of Adhesives, Third Ed., pp. 206–207, Van Nostrand Reinhold, New York, 1990.

*Primary Examiner*—Thomas J. Herbert, Jr.
*Attorney, Agent, or Firm*—Young & Thompson

[57] ABSTRACT

A method of producing a metal gasket includes steps of alkaline cleaning a metal plate, coating a non-rinse chemical for chromate conversion of surfaces of the metal plate and drying to form chromate films, coating an adhesive on the chromate films and drying or baking the adhesive to form adhesive layers, and coating a rubber compound of a sheet-like or an amorphous mixed compound to a predetermined thickness on the adhesive layers and heating and vulcanizing the rubber compound to form rubber coated metal plate. A metal gasket manufactured in this manner has a high bonding power of the rubber layers to the metal plate to obtain an improved durability for long use.

4 Claims, 4 Drawing Sheets

FIG_3

METAL GASKET AND METHOD OF PRODUCING THE SAME

BACKGROUND OF THE INVENTION

This invention relates to a metal gasket for use in automobile engines, screw engines, freezing equipment, air conditioning units and the like, and to a method of producing the metal gasket.

As gaskets for automobile engines, so-called asbestos type gaskets have been widely used which are made of single, jointed or beat sheets of asbestos as sole or composite materials. Recently, however, various new types of gaskets have progressively been used in practice, which are made of metals, graphites, fibers and the like as sole or composite materials, in place of the asbestos which causes a problem of public nuisance. Particularly, metal gaskets provided on their surfaces with rubber layers are superior in performance and cost to other new gaskets in substitution for the asbestos gaskets, and are expected to be widely used in the future.

The sealing capability and durability are important among various properties required in gaskets for automobiles. It has been proposed to deposit a rubber coating layer directly on surfaces of a metal plate as a substrate in order to improve the sealing capability. In case of metal gaskets, however, the sealing capability and durability depend mainly upon the bonding power between the metal plate and the rubber coating layer. It is therefore important in manufacturing rubber-coated metal gaskets to improve the bonding power therebetween and to prevent the bonding power from lowering in use conditions.

Therefore, attempts have been made to improve the bonding power between the metal plate and the bonding layer or the rubber layer and to maintain the improved bonding power for a long period of time with the aid of an activation treatment or galvanizing which is applied to the surfaces of the metal plate.

Recently, however, high performance automobile engines have been developed and widely used so that metal gaskets are also used under more severe conditions, with the result that the durability of the gaskets has become still more important. Under such circumstances, even the above gaskets of metals coated with rubber coating layers encounter a problem of insufficient durability.

SUMMARY OF THE INVENTION

It is an object of the invention to provide a metal gasket and a method of producing the same which eliminate all the disadvantages of the prior art and provide an improved metal gasket which has high bonding power of rubber layers to a metal substrate to improve the durability of the metal gasket for long use.

In order to achieve the object, a metal gasket according to the invention comprises a metal plate, a chromate film on at least one surface of the metal plate formed by coating a non-rinse chemical for chromate conversion thereon, an adhesive coating on the chromate film and a rubber compound layer provided thereon.

A method of producing a metal gasket according to the invention comprises steps of coating a non-rinse chemical for chromate conversion on at least one surface of a metal plate and drying it in a first process, coating an adhesive thereon in a second process, and providing a rubber compound layer thereon and vulcanizing it in a third process.

According to the invention, by coating the non-rinse chemical for chromate conversion on a metal plate before providing a rubber type coating layer on the metal plate, the bonding power of the rubber layers to the metal plate is further improved to obtain superior durability for long use.

Moreover, the chromate treatment with the non-rinse chemical for chromate conversion used in the invention is easy in operation in comparison with the chemical reaction conversion and the electrolytic treatment. Furthermore, the chromate treatment has an advantage of enabling thicknesses of the chromate films to be easily controlled.

The invention will be more fully understood by referring to the following detailed specification and claims taken in connection with the appended drawings.

DESCRIPTION OF THE PREFERRED EMBODIMENTS

Figure 1:
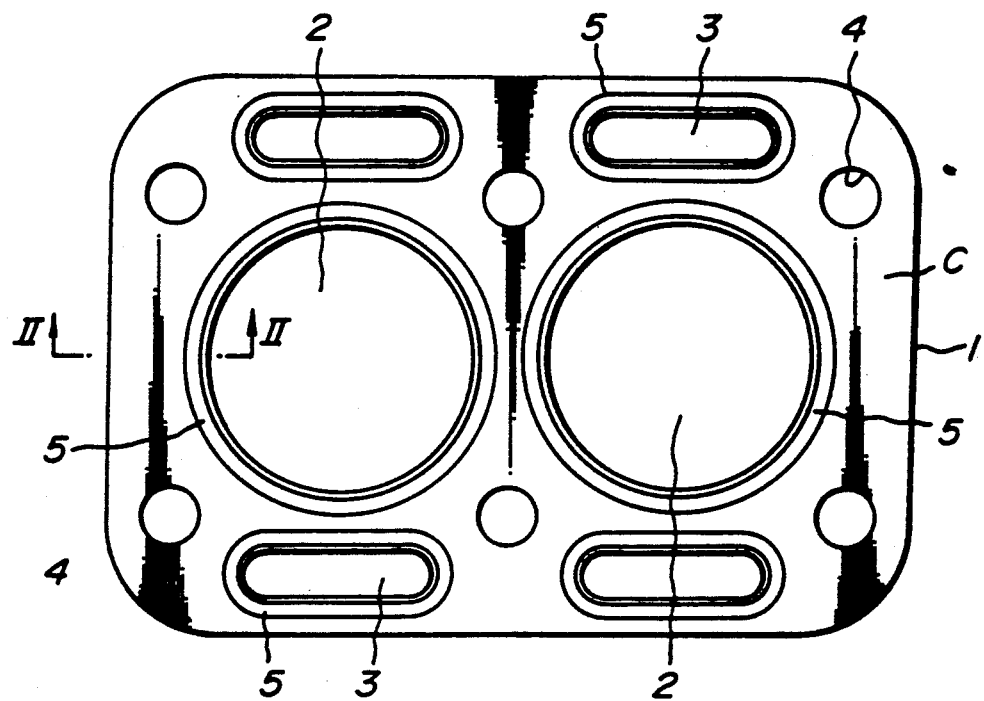
FIG. 1 is a plan view of one embodiment of a metal gasket according to the invention.
Figure 2:
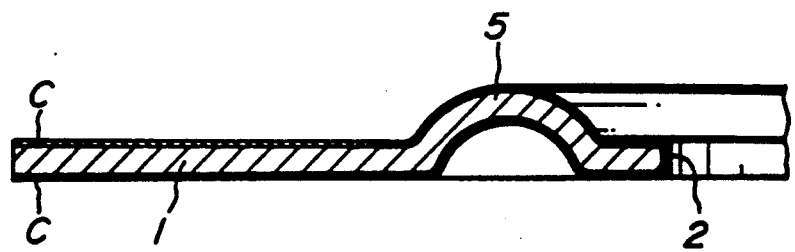
FIG. 2 is an enlarged sectional view of the gasket shown in FIG. 1.
Figure 3:
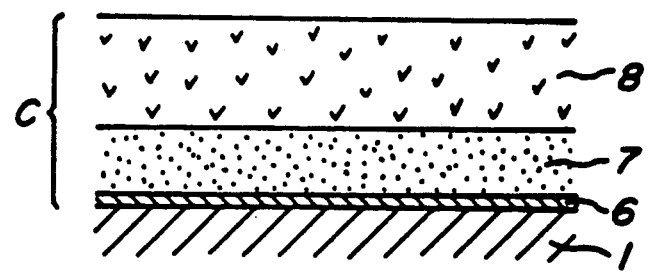
FIG. 3 is a partial enlarged view of FIG. 2.

FIG. 1 illustrates one embodiment of the metal gasket according to the invention. The metal gasket comprises a metal plate 1 as a substrate and coating layers C coated on both sides of the metal plate 1 (FIGS. 2 and 3). The gasket is formed with a cylinder opening 2, cooling water openings 3 and bolt apertures 4. The gasket is further formed with beads 5 about the cylinder opening 2 and the cooling water openings 3.

As shown in FIG. 3 illustrating a section of the gasket on an enlarged scale, the metal gasket is made by the following process. First, a metal plate 1 is pickled or cleaned and water-rinsed. Surfaces of the metal plate 1 are then coated with a non-rinse chemical for chromate conversion shown at 6 in FIG. 3. After the coated metal plate 1 has been dried, the coated surfaces are further coated with a rubber adhesive 7 and baked. Moreover, the surfaces coated with the rubber adhesive are coated with a rubber compound 8. Thereafter, the rubber compound on the metal surfaces is vulcanized to complete the coating layers C on the surfaces of the metal plate 1.

The metal plate used as substrate may be a stainless steel sheet or a carbon steel sheet. As an alternative, it may be zinc-plated stainless plate or a zinc-plated carbon steel plate.

The method of producing the metal gasket according to the invention will be explained in detail hereinafter.

Figure 4:
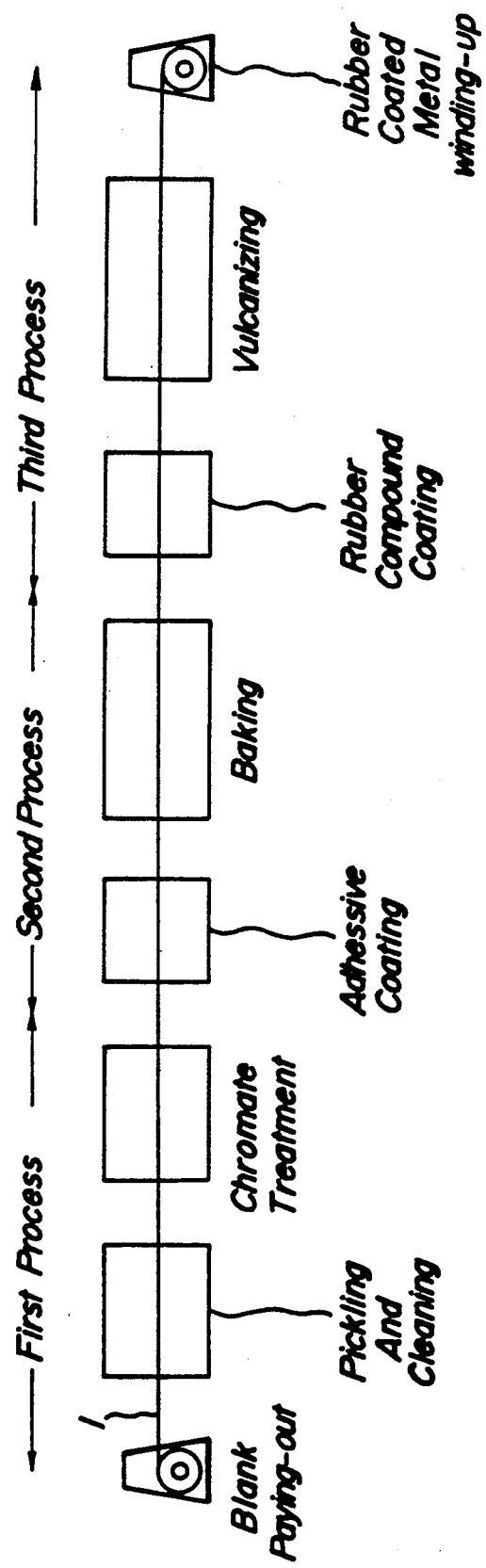
FIG. 4 is a block diagram illustrating processes for carrying out the method according to the invention.

The method is shown in the process flow diagram of FIG. 4. As shown in FIG. 4, the chromate film 6 on the metal plate 1 is produced in a first process and the rubber adhesive 7 is provided in a second process. The rubber compound 8 is provided in a third process. The chromate film 6 is produced by a tarnishing reaction of the chromate conversion in the first process. A stainless steel plate coil having a predetermined thickness is used as a blank material which is pickled and water-rinsed in the first process.

In the first process, a chemical for chromate conversion for steel materials consisting mainly of an aqueous chrome composition and functional chemicals is coated on the metal surface and dried to form the chromate film 6 which is closely bonded to the metal plate 1 and has a chromium of the order of 20–30 mg/m$^2$ as shown in FIG. 3.

In the second process, the rubber adhesive as a primer is coated on the chromate film 6 and baked to form the rubber adhesive layer 7. The adhesive layer 7 is closely bonded onto the chromate film 6 and has a thickness of about 5–30 μm.

In the third process, moreover, the heat-resistant rubber compound is coated on the adhesive layer 7 to a predetermined thickness and vulcanized to form the rubber layer 8 closely bonded to the adhesive layer 7. In this manner, a rubber coated metal as a substrate for the metal gasket is obtained.

Instead of coating the rubber compound in the third process, a rubber compound in the form of a sheet or kneaded amorphous rubber compound having a predetermined thickness may be attached to the adhesive layer. In the third process, after the rubber compound is coated on the adhesive layer, the rubber compound layer may be heated and vulcanized, while surface pressure is being applied to a surface of the rubber compound layer.

The chromate film 6 formed in the first process of the method according to the invention has great effects to improve the practical use of the metal gasket. In more detail, the chromate film 6 serves to increase the bonding force and improve the scratch-resistance of the gasket, as well as its water-resistance, antifreeze coolant-resistance and the like.

By providing the chromate film 6, the resistance to physical or mechanical scratching is increased so that occurrence of scores in the adhesive layer and the rubber layer is prevented. The scratch-resistance is estimated by a coin scratch test wherein the surfaces in question are scratched by a jig in the form of a coin having serrations at its edge.

There are various testing methods for estimating the performance of rubber coated metals, such as the Erichsen test, water-resistance test, antifreeze coolant-resistance test, brine-resistance test, oil-resistance test and the like. The sealing faculty and durability are important as useful properties for metal gaskets and depend mainly upon the bonding power for a long period of time between the metal plate and the rubber layer. Therefore, in order to ascertain the long-term bonding power of the rubber layer, rubber coated metals as substrates of metal gaskets are often tested by boiling water durability test and antifreeze coolant durability test as durability tests for metal gaskets for automobiles. With these tests, it can be judged that the longer the time until the rubber layers separate, the higher the long-term bonding power.

In order to compare the rubber coated metals of the embodiment of the invention with those of the prior art (Comparative Example), a comparative test was effected. At the same time, performances of the rubber coated metals according to the invention were tested by changing ingredients of the adhesive and the rubber compound used in the second and third processes and changing amounts of chromium of the chromate film formed in the first process.

TABLE I

| Comparative Test | | |
|---|---|---|
| | Embodiment 1 | Comparative example |
| Blank material | SUS* | SUS |
| Amount of chromium by chromate treatment | 30 mg/m$^2$ | none |
| Adhesive | NBR type (standard ingredient) | NBR type (standard ingredient) |
| Rubber compound | NBR type (standard ingredient) | NBR type (standard ingredient) |
| Boiling water durability test (100° C.) | >2,000 h | 72 h |
| Antifreeze coolant durability test (130° C.) | 168 h | 24 h |

*Stainless steel (Japanese Industrial Standard)

TABLE II

| Amounts of chromium affecting performances of metal gaskets | | | |
|---|---|---|---|
| | Embodiment 1 | Embodiment 2 | Embodiment 3 |
| Blank material | SUS | SUS | SUS |
| Amount of chromium by chromate treatment | 30 mg/m$^2$ | 60 mg/m$^2$ | 100 mg/m$^2$ |
| Adhesive | NBR type (standard ingredient) | NBR type (standard ingredient) | NBR type (standard ingredient) |
| Rubber compound | NBR type (standard ingredient) | NBR type (standard ingredient) | NBR type (standard ingredient) |
| Boiling water durability test (100° C.) | >2,000 h | >4,000 h | >5,000 h |
| Antifreeze coolant durability test (130° C.) | 168 h | 240 h | 336 h |

TABLE III

| Ingredients of rubber affecting performances of metal gaskets | | | |
|---|---|---|---|
| | Embodiment 1 | Embodiment 4 | Embodiment 5 |
| Blank material | SUS | SUS | SUS |
| Amount of chromium by chromate treatment | 30 mg/m$^2$ | 30 mg/m$^2$ | 30 mg/m$^2$ |
| Adhesive | NBR type (standard ingredient) | NBR type (ingredient to enhance heat-resistance) | NBR type (ingredient to antifreeze coolant resistance) |
| Rubber compound | NBR type (standard ingredient) | NBR type (ingredient to enhance heat-resistance) | NBR type (ingredient to antifreeze coolant resistance) |
| Boiling water durability test (100° C.) | >2,000 h | >2,000 h | >3,000 h |
| Antifreeze coolant durability test (130° C.) | 168 h | 216 h | 312 h |

The ingredients of the rubber compound in the above tests were an NBR (acrylonitrile butadiene rubber) polymer, a curing agent, a reinforcer, a plasticizer, an accelerator, an antioxidant and a filler. In the embodiments 4 and 5 in Table III, different kinds of the polymer and different amounts thereof from those of the standard ingredients were used.

Figure 5A:
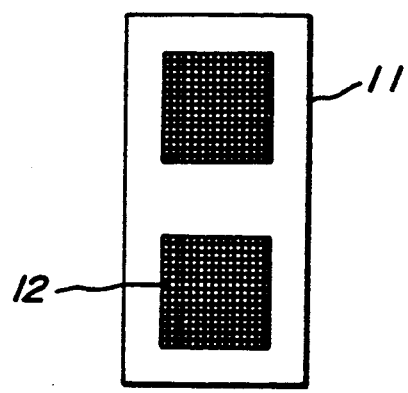
FIGS. 5a and 5b are views for explaining the boiling water and antifreeze coolant durability tests for metal gaskets.

The boiling water durability test and the antifreeze coolant durability test were carried out in the following manner. As shown in FIG. 5a, specimens of the rubber coated metals were rectangular plates 11 of a size 50 mm×100 mm. Each specimen was formed on upper and lower halves with marking-off lines 12 in a checkerboard pattern whose distances between the lines were about 1 mm as shown in FIG. 5a.

Figure 5B:
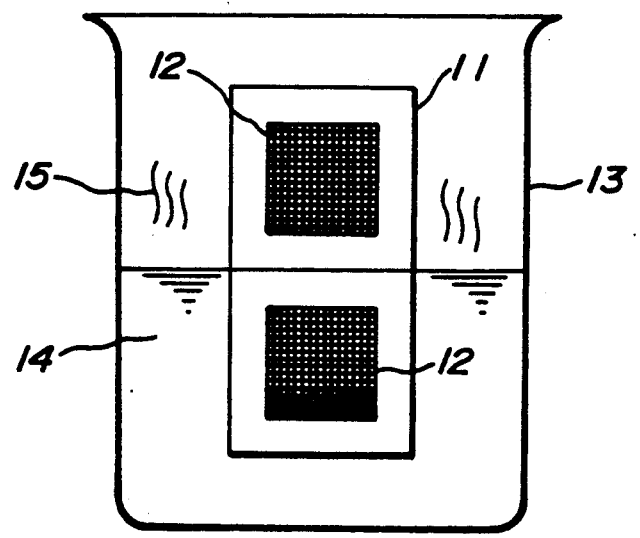

The lower half of the specimen 11 was immersed - in a liquid 14 in a vessel 13 as shown in FIG. 5b. The liquid 14 was maintained at 100° C. in the boiling water durability test and at 130° C. in the antifreeze coolant durability test. Hours until the marking-off lines 12 disappeared were measured. The longer the time, the better was the durability. The upper portion of the specimen was exposed to vapour 15 rising from the liquid 4 used in the test.

As can be seen from Table I, the metal gasket according to the invention is considerably improved in its boiling water durability and antifreeze coolant durability.

As shown in Table II, the boiling water durability and antifreeze coolant durability are significantly improved by increasing the amount of chromium in the chromate treatment.

Moreover, the boiling water durability and antifreeze coolant durability are also remarkably improved by changing the ingredients of the rubber compound to enhance the heat-resistance and the antifreeze coolant resistance as shown in Table III.

It is clear that the metal gasket according to the invention is superior in keeping high bonding power of the coating in long use.

As can be seen from the above description, according to the invention by coating the non-rinse chemical for chromate conversion on a metal plate before providing a rubber type coating layer on the metal plate, the bonding power of the rubber layers to the metal plate is further improved to obtain the superior durability for long use.

Moreover, the chromate treatment with the non-rinse chemical for chromate conversion used in the invention is easy in operation in comparison with the chemical reaction conversion and the electrolytic treatment. Furthermore, the chromate treatment has an advantage of enabling the thicknesses of the chromate films to be easily controlled.

According to the invention as above described, by introducing the process of coating and drying the non-rinse chemical for chromate conversion, the bonding power of the rubber layer is increased to improve the sealing capability and the durability of the metal gasket for automobiles without making difficult the operation in the production line.

Moreover, the invention is applicable to metal gaskets not only for automobiles but also for screw engines, freezing equipment, air conditioning units and various industrial apparatuses.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A metal gasket comprising a metal plate, a chromate film on at least one surface of the metal plate, an adhesive coated on the chromate film and a layer of acrylonitrile butadiene rubber provided on said adhesive; wherein said chromate film is a chromate conversion coating formed by contacting the metal plate with a chromate-treating liquid followed by drying of the resultant chromate film, and wherein said metal plate is a steel plate formed from stainless steel sheet or carbon steel sheet.

2. A metal gasket as set forth in claim 1, wherein said metal plate is zinc-plated stainless steel or zinc-plated carbon steel plate.

3. A metal gasket as set forth in claim 1, wherein said chromate-treating liquid comprises an aqueous chromium composition with a functional chemical.

4. A metal gasket as set forth in claim 1, wherein said adhesive is a acrylonitrile butadiene rubber adhesive.

* * * * *